Figure 1:
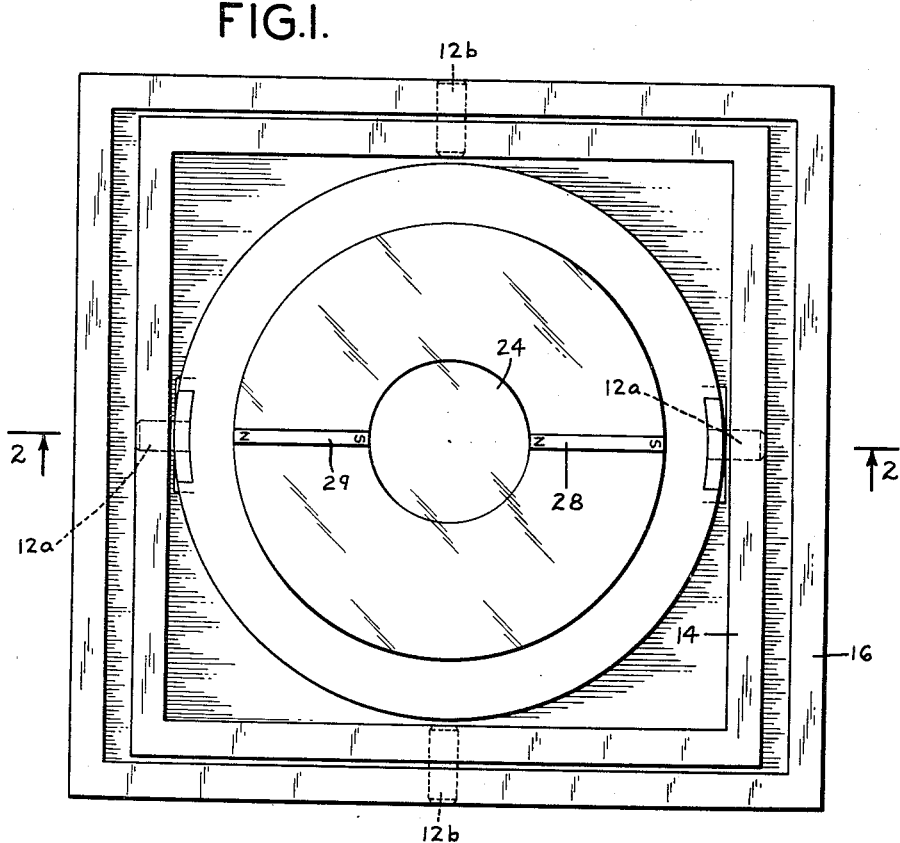

Dec. 18, 1962     C. E. GOSHEN     3,068,583
FLOTATION TYPE COMPASS
Filed April 6, 1960

INVENTOR
CHARLES E. GOSHEN
BY
HIS ATTORNEYS

United States Patent Office 3,068,583
Patented Dec. 18, 1962

3,068,583
FLOTATION TYPE COMPASS
Charles E. Goshen, Bethesda, Md. (University Medical Center, Morgantown, W. Va.)
Filed Apr. 6, 1960, Ser. No. 20,479
6 Claims. (Cl. 33—223)

This invention relates to a novel flotation type compass.

In conventional magnetic compasses, a bar magnet is suspended from a central jewelled bearing and floated on a liquid to maintain the magnet in a horizontal position and to dampen excursions thereof. The friction of the bar magnet needle on the jewelled bearing surface is, however, such as to produce a high degree of resistance against movement of the needle for small changes in the orientation of the compass. This friction or resistance further causes a non-uniform rotational movement of the needle as the compass orientation is shifted.

Another source of inaccuracy in conventional compasses is caused by the phenomena of magnetic dip or inclination, experienced in the middle, northern, and southern latitudes, and caused by the true position of the center of the earth's magnetism as compared to the positions of the geographic North and South Poles. As a result of this dip, the north or south seeking elements of the compass magnet may point in a direction at an angle considerably below a plane tangential to the earth's surface.

Most automatic pilot sensing devices which employ magnetic compasses require that the compass needle supply power to actuate the automatic pilot. The low torsion of a magnetic compass makes very little power available for this purpose, and presents the dilemma of selecting either a low power requirement which reduces the sensitivity of the automatic pilot or a high power requirement, which produces so much drag on the compass needle that it becomes inaccurate for small deflections.

Accordingly, there is provided in the instant invention a novel bearing for a flotation type compass designed to replace the customary bearing support and to obtain a friction-free centering of a bar magnet needle within its housing. Essentially, the compass comprises a hemispherically shaped housing container having a liquid therein on which a compass needle is adapted to be floated. Attached to the underside of the needle and vertically orientated with respect to it, is a bar magnet, having its north-seeking pole facing in a downward direction. A metallic sphere, such as a steel sphere, is placed in the compass hemispherical container and is permitted to freely position itself at the bottom of the container. By the force of gravity, the steel sphere is maintained along a permanent vertical center axis of the container, relative to the earth's surface, and the magnet, which is attracted to the metallic sphere, thereby holds the needle in the approximate center of the container and performs the functions of the conventional bearing support. Also, since the magnet is caused to maintain an approximately permanent vertical orientation, the needle is maintained in a horizontal plane, thereby compensating for or eliminating error caused by magnetic dip.

Figure 2:
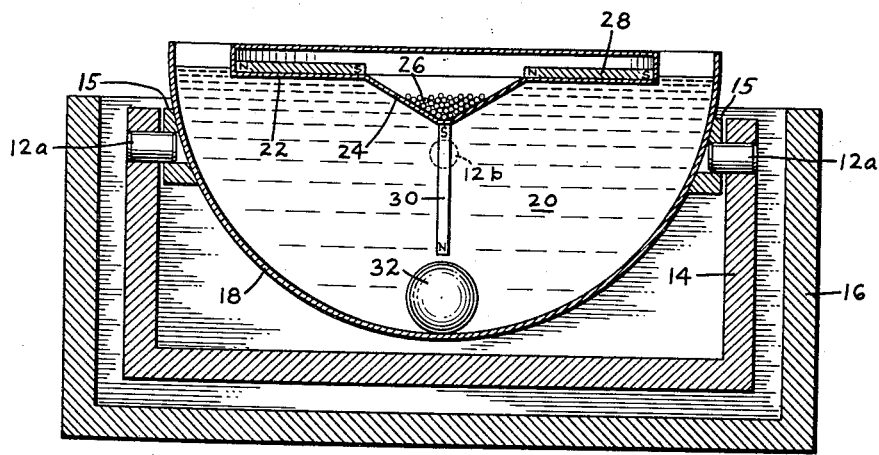

Other objects and advantages will become apparent upon further consideration of the specification and accompanying drawings, in which:

FIGURE 1 is a plan view of the compass needle and housing embodying the concepts of the present invention; and FIGURE 2 is a section view taken along line 2—2 of FIGURE 1.

Referring to FIGS. 1 and 2, there is illustrated a conventional gimbal mounting showing gimbal points of suspension, 12-a and 12-b, for gimbal rings 14 and 15, supported within an outer frame 16. The compass housing 18 is supported, as shown, by the inner gimbal ring 15, and is maintained relatively level by swiveling of the gimbal rings 14 and 15 within each other and within the outer frame 16 on axes that are at right angles with respect to each other. The compass housing 18 is of a hemispherical shape and is adapted to contain a suitable liquid 20, such as alcohol or kerosene. Preferably, the housing is made of a plastic to prevent it from affecting the action of the bar magnets in any way. Floating on top of the liquid is a flat, circular, air-filled, plastic disc 22 of the shape shown in FIGS. 1 and 2, having a depressed, cone-shaped, area 24 which may be filled with lead shot 26 or the like for obtaining the level of flotation desired. On opposite sides of the disc and aligned along a diameter thereof, opposed bar magnets 28 and 29 are positioned equidistant from the center of the disc and orientated to have their North and South Poles facing in the same directions. They are cemented in place to prevent movement of them relative to the plastic disc itself. A third bar magnet 30 is attached to the bottom of the cone-shaped area 24 and in the center of the disc 22, and is orientated in a plane perpendicular to that of the compass magnets 28 and 29, with its north-seeking pole directed downwardly. A sizeable, solid steel sphere 32 is placed at the bottom of the hemispherical compass housing 18, and is permitted to freely move within the housing 18 and to position itself, by the force of gravity, at the bottommost portion thereof. The location of the sphere thus will always be along the vertical axis of the housing 18, regardless of the angle at which the latter may be tipped. The sphere 32 attracts the second mentioned bar magnet 30 thereby maintaining the magnet 30 along the vertical axis of the housing 18 and the floating disc 22 in the center of the housing away from its side walls, thereof. In this way, the arrangement performs the function of the conventional jewelled bearing. Also, since the magnet 30 will always be maintained in a vertical plane by the arrangement, the compass magnets 28 and 29 will always be held in a horizontal plane, regardless of the effect of magnetic dip, small disturbances in the surface of the liquid, and motion of the craft being guided. The weight of the sphere 32 should be sufficient to prevent the magnet 30 from pulling the sphere off the bottom of the housing 18. It should also be adjusted along with the specific gravity of the liquid 20, weight of the lead shot 26 in the disc 22, and the like, to cause the vertical magnet 30 to be suspended a distance of about ⅛ of an inch from the sphere, although this distance may be varied, depending upon the particular components selected.

Wherein, the invention has been described herein with particularity, it is to be understood that variations may be made in the compass and other novel concepts contained herein without departing from the scope of the present invention as defined in the following claims.

I claim:

1. Means for mounting a rotatable element comprising in combination, a housing containing a liquid and having a concave bottom surface, said rotating element being adapted to be floated on said liquid, magnet means vertically attached to said element, and metallic sphere means freely movable on the bottom surface of said housing and adapted to cooperate with said magnet means for mutual attraction therebetween whereby the rotational axis of said rotating element is maintained substantially vertical regardless of the position of the housing.

2. In a flotation-type compass, the combination of a housing containing a liquid and having a concave bottom surface, a north and south seeking element adapted to be floated on said liquid, magnet means vertically attached to said element, and metallic sphere means freely movable on the bottom surface of said housing and adapted to cooperate with said magnetic means for mutual attraction therebetween whereby the rotational axis of said north and south seeking element is maintained substantially vertical regardless of the position of the housing.

3. In a flotation-type compass, the combination of a magnetized north and south seeking element having a concave bottom surface, a semispherical, liquid filled, housing for said element, means for floating said element on said liquid, magnet means vertically attached to the bottom of and at the center of said floating means, and metallic sphere means freely movable on the bottom surface of said housing to which said first means is attached.

4. A magnetic flotation-type compass and bearing therefor comprising in combination, a hemispherical compass housing, a gimbal mounting therefor to maintain said housing in an approximately horizontal position, liquid contained in said housing, at least one compass bar magnet having north and south seeking poles, means adapted to be floated on said liquid and to hold said bar magnet substantially parallel to the level of the liquid, a second bar magnet attached to the underside of said floating means and perpendicularly orientated relative to said north and south seeking bar magnet, and a metallic sphere freely positioned at the bottom of said compass housing, said combination being arranged so that the said second bar magnet is strongly attracted to said sphere.

5. A magnetic flotation-type compass according to claim 1 and including ballast means in the rotating element whereby the level at which said rotating element floats in the liquid may be varied.

6. A magnetic flotation-type compass according to claim 2 wherein said north and south seeking element comprises a plastic air filled hollow disc, and two spaced apart bar magnets having north and south seeking poles having their longitudinal axes positioned along a diameter of said disc.

References Cited in the file of this patent
UNITED STATES PATENTS

| | | |
|---|---|---|
| 1,294,710 | Roland | Feb. 18, 1919 |
| 1,491,593 | Eriksen | Apr. 22, 1924 |
| 1,754,055 | Senter | Apr. 8, 1930 |
| 2,260,396 | Otto | Oct. 28, 1941 |
| 2,325,365 | Britten | July 27, 1943 |
| 2,638,683 | Reece et al. | May 19, 1953 |